United States Patent
Schuchardt

(10) Patent No.: US 6,875,879 B2
(45) Date of Patent: Apr. 5, 2005

(54) OLEFIN POLYMERIZATION CATALYSTS CONTAINING TRIQUINANE LIGANDS

(75) Inventor: Jonathan L. Schuchardt, Royersford, PA (US)

(73) Assignee: Equistar Chemicals, LP, Houston, TX (US)

(*) Notice: Subject to any disclaimer, the term of this patent is extended or adjusted under 35 U.S.C. 154(b) by 0 days.

(21) Appl. No.: 10/686,335

(22) Filed: Oct. 14, 2003

(65) Prior Publication Data

US 2004/0077808 A1 Apr. 22, 2004

Related U.S. Application Data

(62) Division of application No. 10/117,903, filed on Apr. 8, 2002, now Pat. No. 6,693,157.

(51) Int. Cl.$^7$ ............................................... C07F 17/00
(52) U.S. Cl. ............................ 556/53; 556/51; 556/52; 526/160; 526/170; 526/943
(58) Field of Search ............................ 556/53, 52, 51; 526/160, 170, 943

(56) References Cited

U.S. PATENT DOCUMENTS

| | | | | |
|---|---|---|---|---|
| 4,855,322 A | | 8/1989 | Kasha et al. ................ | 514/546 |
| 5,153,157 A | | 10/1992 | Hlatky et al. ............... | 502/117 |
| 5,198,401 A | | 3/1993 | Turner et al. ............... | 502/155 |
| 5,241,025 A | | 8/1993 | Hlatky et al. ............... | 526/129 |
| 5,414,180 A | | 5/1995 | Geerts et al. ............... | 585/525 |
| 5,637,660 A | | 6/1997 | Nagy et al. .................. | 526/160 |
| 5,648,440 A | | 7/1997 | Sugano et al. .............. | 526/132 |
| 5,917,072 A | * | 6/1999 | Banzi et al. .................. | 556/53 |
| 6,211,311 B1 | | 4/2001 | Wang et al. ................. | 526/131 |
| 6,228,959 B1 | * | 5/2001 | Nagy .......................... | 526/134 |
| 6,414,099 B1 | * | 7/2002 | Hlatky et al. ............... | 526/161 |
| 6,544,918 B1 | * | 4/2003 | Nagy et al. ................. | 502/103 |

OTHER PUBLICATIONS

Mehta et al. J. Am. Chem. Soc. 1986, 108, 3443.*
Dailey et al. J. Org. Chem. 1987, 52, 1984.*
Cloke, F.G.N. Pure Appl. Chem. 2001, 73, 233–238.*
Brookhart, Chem. Rev. 100 (2000) 1169.
G. Mehta et al., J. Am. Chem. Soc. 108 (1986) 3443.
R. Hutchins., J. Org. Chem. 40 (1975) 923.
G. Kabalka et al., J. Org. Chem. 41 (1976) 574.
O. Dailey, Jr., J. Org. Chem. 52 (1987) 1984.
Huang–Minlon, J. Am. Chem. Soc. 68 (1946) 2487.
J. March, Advanced Organic Chemistry, 2d ed. (1977) pp. 997–998.
Schlosser et al., Angew. Chem.. I.E. Engl. 12 (1973) 508.
Lochmann et al., Tetrahedron Lett. (1966) 257.
Mehta et al., J. Am. Chem. Soc. 108 (1986) 3451.

* cited by examiner

Primary Examiner—Tatyana Zalukaeva
Assistant Examiner—Rip A. Lee
(74) Attorney, Agent, or Firm—Jonathan L. Schuchardt

(57) ABSTRACT

A catalyst system useful for polymerizing olefins is disclosed. The catalyst system comprises an activator and an organometallic complex that incorporates a Group 3 to 10 transition metal and at least one chelating, dianionic triquinane ligand. The cis,syn,cis-triquinane framework is generated in three high-yield steps from inexpensive starting materials, and with heat and light as the only reagents. By modifying substituents on the triquinane ligand, polyolefin makers can control catalyst activity, comonomer incorporation, and polymer properties.

9 Claims, No Drawings

OLEFIN POLYMERIZATION CATALYSTS CONTAINING TRIQUINANE LIGANDS

CROSS-REFERENCE TO RELATED APPLICATION

This application is a divisional of application Ser. No. 10/117,903, filed Apr. 8, 2002, now U.S. Pat. No. 6,693,157.

FIELD OF THE INVENTION

The invention relates to catalysts useful for olefin polymerization. In particular, the invention relates to transition metal polymerization catalysts that incorporate a chelating, dianionic triquinane ligand.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Traditional metallocenes incorporate one or more cyclopentadienyl (Cp) or Cp-like anionic ligands such as indenyl, fluorenyl, or the like, that donate pi-electrons to the transition metal. Non-metallocene single-site catalysts, including ones that capitalize on the chelate effect, have evolved more recently. Examples are 8-quinolinoxy or 2-pyridinoxy ligands (see U.S. Pat. No. 5,637,660) and the bidentate bisimines of Brookhart (see Chem. Rev. 100 (2000) 1169).

Recently, we described chelating bicyclic dianionic ligands useful for olefin polymerization catalysts (see copending application Ser. No. 09/907,180, filed Jul. 17, 2001). In these complexes, one ligand chelates to the metal through two separate allylic anions, each of which is a 4-pi electron donor. Molecular modeling calculations indicate that the steric and electronic environments of these ligands are comparable to those of conventional metallocene ligands. Their "open architecture" suggests that comonomer incorporation will be facile. Triquinane or other tricyclic dianionic ligands are not disclosed.

We also described earlier the use of Diels-Alder and photo-chemical [2+2] cycloaddition reactions in tandem to make "caged diimide" complexes (see copending application Ser. No. 09/691,285, filed Oct. 18, 2000). Conversion of a caged diketone to the corresponding diimine, followed by preparation of a transition metal complex incorporating the neutral diimine ligand affords complexes useful for olefin polymerization.

The tandem strategy was used by G. Mehta et al. (J. Am. Chem. Soc. 108 (1986) 3443) in a remarkable route to triquinane natural products such as (±)-hirsutene and (±)-capnellene. The key to assembling these skeletons efficiently was recognizing that the cis,syn,cis-triquinane skeleton is available in three steps in near-quantitative yield (>80% overall) from inexpensive starting materials (p-benzoquinone and cyclopentadienes), and essentially no chemical reagents other than a reaction solvent (in addition to heat, and light):

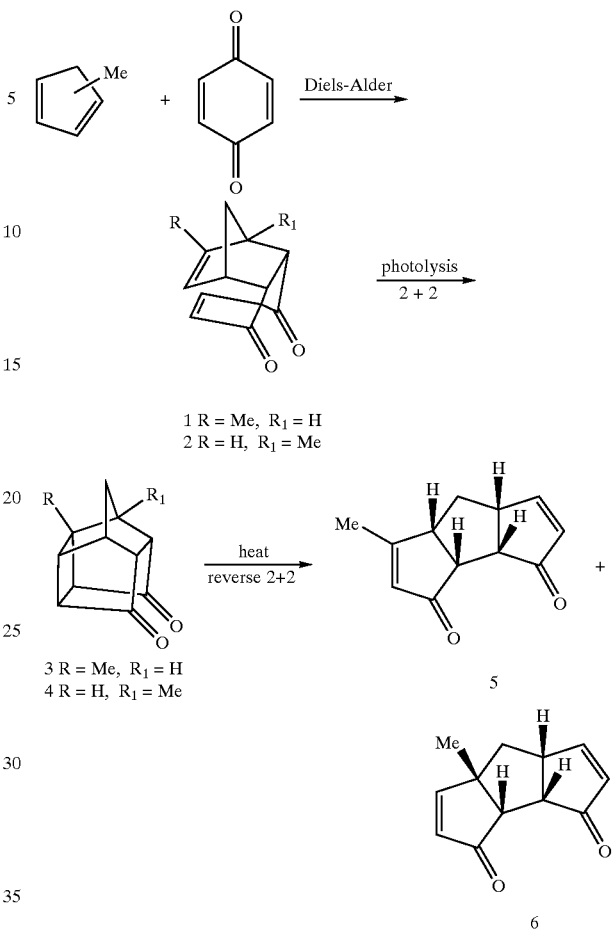

In the example shown above, simple thermolysis of pentacyclic diketones 3 and 4 gave only the cis,syn,cis-triquinane bis(enone)s 5 and 6. After these pivotal, elegant steps, Mehta further elaborated the bis(enone)s to make the desired natural product, capnellene.

The polyolefins industry continues to need new polymerization catalysts. Unfortunately, the organometallic complexes are becoming increasingly complicated and more expensive to manufacture. The industry would benefit from ways to achieve a high level of molecular complexity in relatively few synthetic steps. The accessibility of a host of interesting triquinane skeletons invites polyolefin makers to explore their applicability outside the realm of natural products synthesis. Catalysts with advantages such as higher activity and better control over polyolefin properties are within reach. Ideally, these catalysts would avoid the all-too-common, low-yield, multi-step syntheses from expensive, hard-to-handle starting materials and reagents.

SUMMARY OF THE INVENTION

The invention is a catalyst system useful for polymerizing olefins and a method for making it. The catalyst system comprises an activator and an organometallic complex. The complex incorporates a Group 3 to 10 transition metal and a chelating, dianionic triquinane ligand that is pi-bonded to the metal. The required cis,syn,cis-tricyclic framework is generated in high yield in three steps from inexpensive starting materials, and with heat and light as the only "reagents." Further elaboration to a triquinane diene, a dianionic ligand, and an organometallic complex incorporating the ligand, are facile. By modifying substituents on the triquinane ligand, polyolefin makers can control catalyst activity, comonomer incorporation, and polymer properties.

DETAILED DESCRIPTION OF THE INVENTION

Catalyst systems of the invention include an organometallic complex that contains a Group 3–10 transition metal. "Transition metal" as used herein includes, in addition to the main transition group elements, elements of the lanthanide and actinide series. More preferred complexes include a Group 4 or a Group 8 to 10 transition metal.

The organometallic complex includes at least one chelating, dianionic triquinane ligand. The ligand "chelates" with the transition metal by bonding to it with two separate allylic bonds, each of which is a 4-pi electron donor. The ligand is "dianionic," i.e., it has a net charge of –2; each of two electron pairs generated by deprotonation is conjugated with a carbon-carbon double bond.

By "triquinane," we mean a carbocyclic framework characterized by three rings in which a central five-membered ring is cis,syn,cis-fused to two additional five- or six-membered rings. Preferably, all of the rings are five-membered. Thus, in an unsubstituted dianionic triquinane, all four bridgehead methine hydrogen atoms occupy the same face of the central five-membered ring. For example:

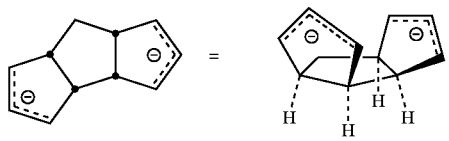

The triquinane framework can be substituted with other atoms that do not interfere with formation of the allylic dianion or incorporation of the dianion into a transition metal complex. For example, the triquinane can be substituted with alkyl, aryl, halide, alkoxy, thioether, alkylsilyl, or other groups. Preferably, the framework is hydrocarbyl.

Preferred triquinane ligands have the general structure:

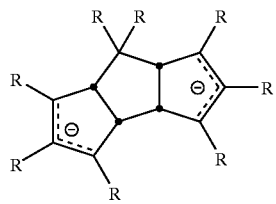

in which each R is independently hydrogen, halide, or $C_1$–$C_{30}$ hydrocarbyl. Preferably, each R is a hydrogen.

The triquinane ligand is made by any suitable method. A preferred method utilizes tandem Diels-Alder and photochemical [2+2] cycloaddition reactions to generate a pentacyclic diketone, which is then converted to a triquinane diene. Double deprotonation generates the desired dianionic ligand.

In one aspect, the invention is a method for making an organometallic complex useful for olefin polymerization. In this method, a pentacyclic diketone such as 7 is first converted to a triquinane diene (e.g., 8) by methods that are detailed further below. Double deprotonation of the diene using a strong base gives a triquinane dianion such as 9. Reaction with a transition metal source gives an organometallic complex (e.g., 10) that incorporates the chelating, dianionic triquinane ligand. Preferably, the pentacyclic diketone is produced by reacting a cyclopentadiene and a p-benzoquinone, optionally in the presence of an organic solvent, to produce a Diels-Alder adduct. The adduct is then preferably irradiated with light of a suitable energy, optionally in the presence of a solvent and sensitizer, to effect a [2+2] cycloaddition reaction to give the pentacyclic diketone.

For example:

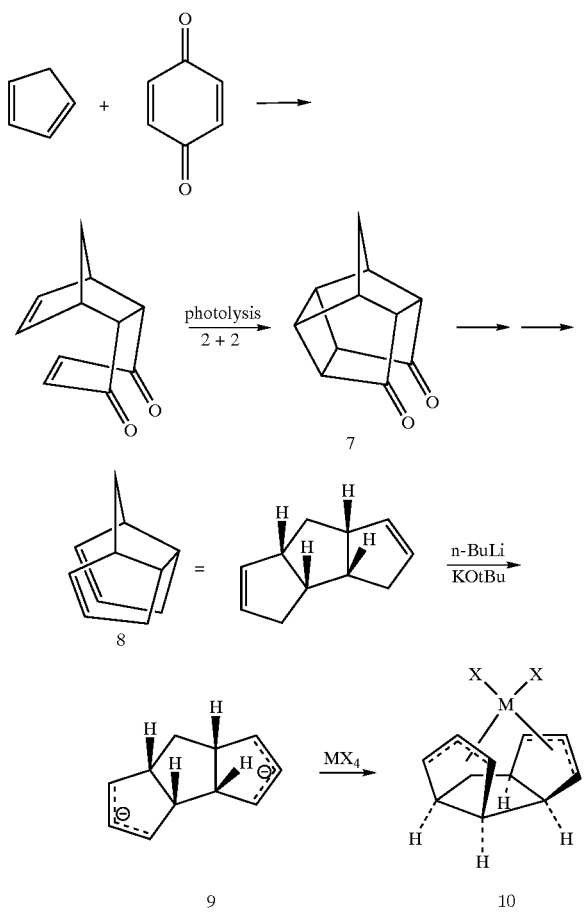

As noted above, the pentacyclic diketone can be converted to a triquinane diene such as 8 by several methods. In one approach, the pentacyclic diketone is first heated to cause a [2+2] cycloreversion reaction to give a cis,syn,cis-triquinane bis(enone), e.g. 11. See Mehta et al., *J. Am. Chem. Soc.* 108 (1986) 3443. For example:

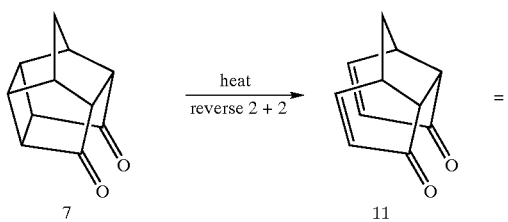

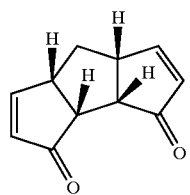

Any suitable method is used to convert the bis(enone) to the triquinane diene. In a two-step approach, the bis(enone) reacts with an arylhydrazine to produce an arylhydrazone. The arylhydrazone is then reduced to the diene by reacting it with either an alkali metal cyanoborohydride (see R. Hutchins et al., *J. Org. Chem.* 40 (1975) 923) or catecholborane (G. Kabalka et al., *J. Org. Chem.* 41 (1976) 574). In another preferred method, the bis(enone) reacts with a trialkylhydrosilane in the presence of a Lewis acid to give the triquinane diene in one step (see O. Dailey, Jr., *J. Org. Chem.* 52 (1987) 1984. These strategies are summarized below. Note that either 8 or 12 will yield the same dianion upon deprotonation:

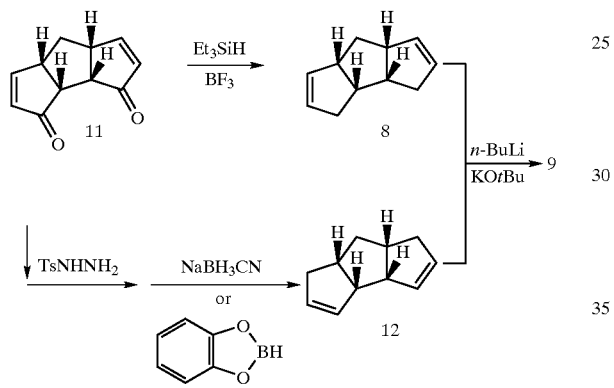

In another preferred approach to making the triquinane diene, the pentacyclic diketone is first converted to a pentacyclic hydrocarbon such as 13 by modified Wolff-Kishner reduction (see Huang-Minlon, *J. Am. Chem. Soc.* 68 (1946) 2487). Heating promotes a [2+2] cycloreversion reaction to give the triquinane diene (e.g., 8):

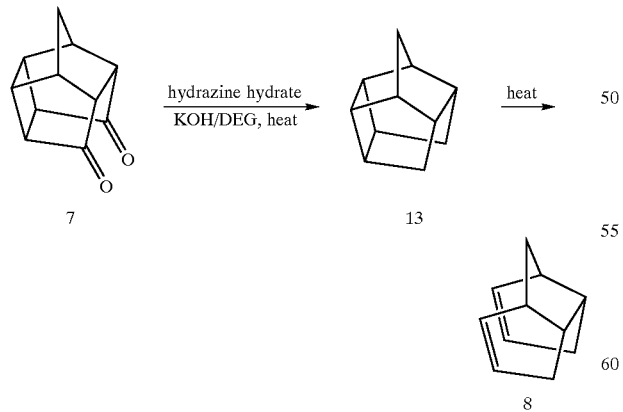

As noted earlier, the "triquinane" framework can actually incorporate six-membered rings. These are conveniently introduced using the valuable "homologation" procedure with excess diazomethane. (See generally J. March, *Advanced Organic Chemistry*, 2d ed. (1977) pp. 997–998, and Example 41 of U.S. Pat. No. 4,855,322). By using the synthetic strategies outlined earlier, the homologated product, e.g. 14, can be elaborated to an organometallic complex such as 15:

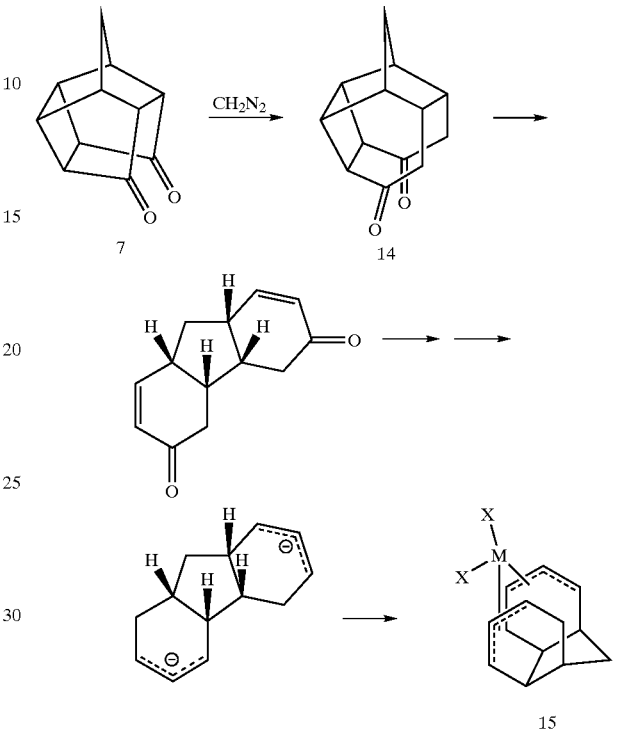

An advantage of the invention is versatility. By selecting the initial Diels-Alder reactants judiciously, one can ultimately make a wide variety of different chelating, dianionic triquinane complexes. This allows a skilled person to "fine tune" the catalyst to improve its activity or enable the preparation of polyolefins having a desirable melt-flow index, molecular weight distribution, density, or other property. A few examples:

1. From a halogenated cyclopentadiene:

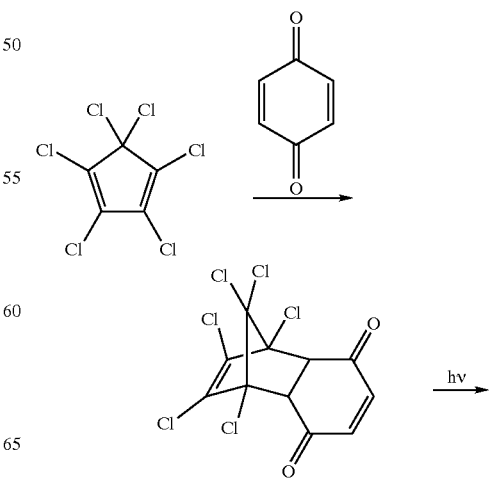

3. From other pentacyclic diketones:

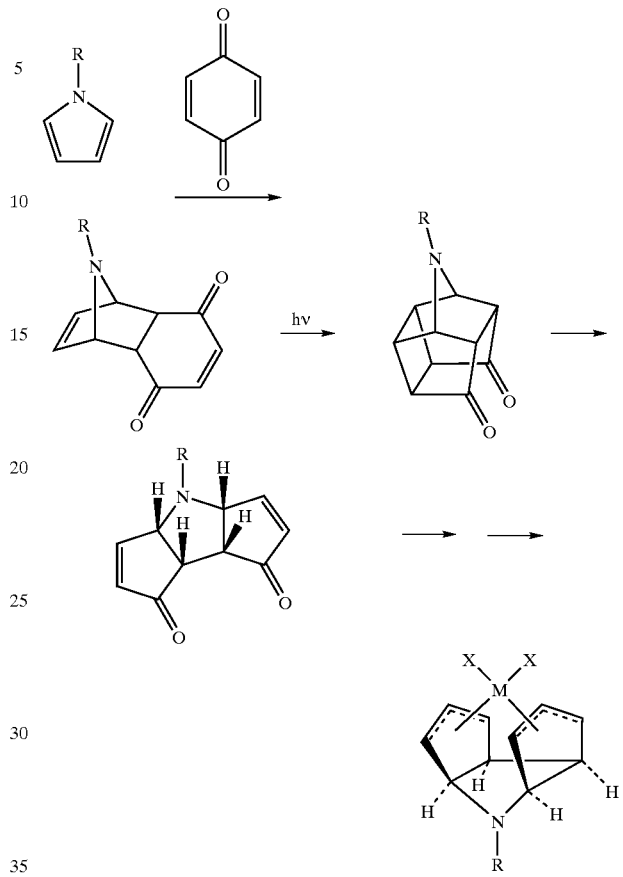

2. From a halogenated p-benzoquinone:

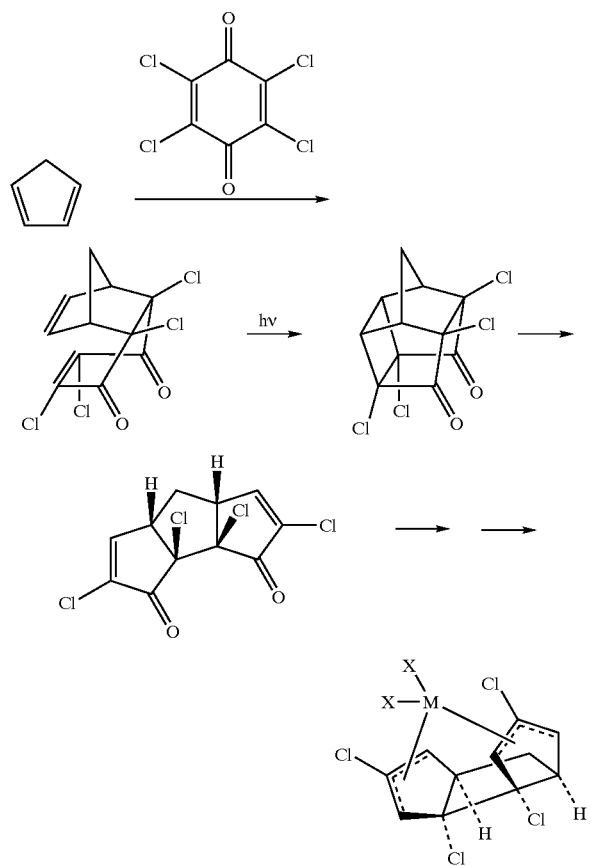

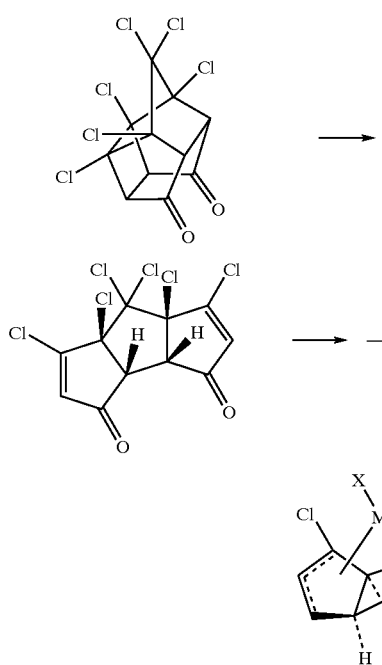

In sum, the invention provides access to a wide variety of complexes that incorporate chelating, dianionic triquinane ligands. The methods discussed at length above are merely illustrative, and those skilled in the art will readily recognize or devise many alternative synthetic methodologies.

Chelating dianionic triquinane ligands are made by doubly deprotonating the corresponding diene with a potent base according to well-known methods. Suitable bases include, for example, alkyllithium compounds (e.g., methyllithium or n-butyllithium), alkali metals (e.g., sodium metal), alkali metal hydrides (e.g., potassium hydride), and Grignard reagents (e.g., methyl magnesium chloride or phenyl magnesium bromide). Particularly preferred deprotonating agents are super-basic reagents prepared by the reaction of alkyllithium compounds and alkali metal t-butoxides, as reported by Schlosser et al. (*Angew. Chem., I. E. Engl.* 12 (1973) 508) and Lochmann et al. (*Tetrahedron Lett.* (1966) 257).

Usually, about two equivalents of the deprotonating agent and about one equivalent of the diene are used to produce the dianionic ligand. Deprotonation can be performed at any suitable temperature, preferably at or below room temperature. While the deprotonation reaction can be performed at temperatures as low as $-78°$ C. or below, it is preferred to perform this step at room temperature.

In addition to the dianionic triquinane ligand, the organometallic complex may include additional labile anionic ligands such as halides, alkyls, alkaryls, aryls, dialkylaminos, or the like. Particularly preferred are halides, alkyls, and alkaryls (e.g., chloride, methyl, benzyl).

Particularly preferred complexes have the structure:

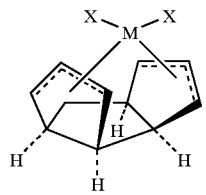

in which M is a Group 4 transition metal and each X is a halide.

The catalyst system includes an activator. Suitable activators help to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl) borate, lithium tetrakis(pentafluorophenyl)aluminate, anilinium tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl) borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference.

The optimum amount of activator needed relative to the amount of organometallic complex depends on many factors, including the nature of the complex and activator, whether a supported catalyst is used, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, of aluminum per mole of transition metal, M. When the activator is an organoborane or an ionic borate or aluminate, the amount used will be within the range of about 0.01 to about 5000 moles, preferably from about 0.1 to about 500 moles, of activator per mole of M.

The activator is normally added to the reaction mixture at the start of the polymerization. However, when a supported catalyst system is used, the activator can be deposited onto the support along with the organometallic complex.

The organometallic complex is prepared according to methods that are well known in the art. In general, the complexes are made by combining the dianionic triquinane ligand with a transition metal source. Any convenient source of transition metal can be used. For example, the complexes can be made from transition metal halides, alkyls, alkoxides, acetates, amides, or the like. A particularly convenient source of the transition metal is the transition metal halide. For example, one can use titanium tetrachloride, zirconium tetrachloride, vanadium (III) chloride-tetrahydrofuran complex (VCl$_3$(THF)$_3$), titanium (III) chloride-THF complex, chromium (III) chloride-THF complex, cobalt (II) chloride, nickel (II) bromide, platinum (II) chloride, palladium (II) chloride, lanthanum (II) chloride, titanium (III) acetate, or the like. Complexes can also be prepared from salts with labile groups, such as tetrakis(acetonitrile)palladium (II) bis(tetrafluoroborate).

The transition metal complexes are easy to make. Usually, the transition metal source (halide, e.g.) is dissolved or suspended in an organic solvent and the dianionic triquinane ligand is carefully added at any desired temperature, preferably from about −78° C. to about room temperature. Refluxing is used if needed to complete the reaction. Insoluble by-products, if any, can be removed by filtration, solvents are evaporated, and the transition metal complex is isolated, washed, and dried. The resulting complex can generally be used without further purification.

The catalyst systems are optionally used with an inorganic solid or organic polymer support. Suitable supports include silica, alumina, silica-aluminas, magnesia, titania, clays, zeolites, or the like. The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150 to about 600° C., prior to use. A variety of different chemical treatments can be used, including reaction with organoaluminum, -magnesium, -silicon, or -boron compounds. See, for example, the techniques described in U.S. Pat. No. 6,211,311, the teachings of which are incorporated herein by reference.

The complex and activator can be deposited on the support in any desired manner. For instance, the components can be dissolved in a solvent, combined with a support, and stripped. Alternatively, an incipient-wetness technique can be used. Moreover, the support can simply be introduced into the reactor separately from the complex and activator.

The loading of complex on the support varies depending upon a number of factors, including the identities of the complex and the support, the type of olefin polymerization process used, the reaction conditions, and other concerns. Usually, the amount of complex used is within the range of about 0.01 to about 10 wt. % of transition metal based on the amount of supported catalyst. A more preferred range is from about 0.1 to about 4 wt. %.

Catalyst systems of the invention are useful for polymerizing olefins. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are especially preferred.

Many types of olefin polymerization processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes.

The olefin polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 15 psig to about 50,000 psig. More preferred is the range from about 15 psig to about 1000 psig.

The following examples merely illustrate the invention. Those skilled in the art will recognize many variations that are within the spirit of the invention and scope of the claims.

EXAMPLE 1

Preparation of a Pentacyclic Diketone

The procedure of Mehta et al. (*J. Am. Chem. Soc.* 108 (1986) at 3451) is generally used.

Freshly cracked cyclopentadiene (10 g, 0.15 mol) in toluene (10 mL) is added in one portion to an ice-cooled solution of p-benzoquinone (16.2 g, 0.15 mol) in toluene (200 mL). The mixture is stirred at room temperature for 1 h, and solvent is removed under reduced pressure. The solid residue is recrystallized from petroleum ether to give the desired Diels-Alder adduct.

The Diels-Alder adduct (about 26 g) is dissolved in nitrogen-purged ethyl acetate (750 mL), and the mixture is irradiated with a Hanowia 450-W medium-pressure mercury vapor lamp in a quartz immersion well through a Pyrex filter for 45 min. Solvent removal and crystallization gives the desired pentacyclic diketone 7.

EXAMPLE 2

Thermal [2+2] Cycloreversion to a Bis(enone)

Mehta's procedure is used to make the bis(enone), 11. Thus, a portion of 7 from Example 1 (2.0 g) is sublimed (130° C., 0.3 mm) through a quartz column that has been preheated to 530° C. (The column (1.5×30 cm) is connected to a vacuum line and provided with a collection flask and liquid nitrogen trap. The quartz tube is wrapped with a nichrome heating wire and asbestos insulation.) The pyrolyzed product from the collection flask is purified by washing it through a column of silica gel using hexane/ethyl acetate (8:2). Removal of solvent gives the desired bis(enone) 11.

EXAMPLE 3

Two-Step Conversion of Bis(enone) to a Triquinane Diene

The method of Hutchins et al. (*J. Org. Chem.* 40 (1975) 923) is generally followed. Bis(enone) 11 (1.9 g, 11 mmol) and p-toluene-sulfonylhydrazine (4.2 g, 24 mmol, 2.2 eq.) in absolute ethanol (10 mL) are heated on a steam bath for about 30 min. Cooling gives a crystalline product, which is recrystallized from ethanol.

The tosylhydrazone product is combined with sodium cyanoborohydride (2.75 g, 44 mmol) and 2 mg of Bromocresol Green in 1:1 dimethylformamide-sulfolane (70 mL). The mixture is heated to 105° C. Concentrated HCl is added cautiously dropwise until the pH is <3.8 as indicated by a color change from blue to tan. About 25 mL of cyclohexane are added, and the reaction mixture is heated with stirring for 1 h. Additional indicator and concentrated HCl are added to keep the pH below 3.8, and heating continues for 1.5 h. The solution is diluted with water (100 mL), and the layers are separated. The aqueous phase is extracted with cyclohexane (3×50 mL), and the combined cyclohexane layers are washed with water, dried, and concentrated. The expected product is diene 12.

EXAMPLE 4

Two-Step Conversion of Bis(enone) to a Triquinane Diene

The method of Hutchins et al. is used to make the tosylhydrazone from bis(enone) 11 as shown in Example 3. The method of Kabalka et al. is then used to make the diene. Thus, the tosylhydrazone product (2.0 g, about 4 mmol) is dissolved in chloroform (10 mL) at 0° C. Catecholborane (0.53 g, 4.4 mmol) is added, and the mixture is stirred for 2 h. Sodium acetate trihydrate (12 mmol, 1.6 g) is added, and the mixture is refluxed gently for 1 h. After typical workup, silica gel chromatography is used to separate the desired material from polar by-products. The expected product is diene 12.

EXAMPLE 5

One-Step Conversion of Bis(enone) to Triquinane Diene

The method of Daley, Jr. (*J. Org. Chem.* 52 (1987) 1984) is generally used. Thus, bis(enone) 11 (1.9 g, 11 mmol), boron trifluoride etherate (3.6 mL, 29 mmol), and triethylsilane (4.6 mL, 29 mmol) are combined and heated at 80–95° C. for 2 h. After cooling, the mixture is combined with water (15 mL) and extracted into ether (3×20 mL). The combined organic layers are washed with 10% aq. $NaHCO_3$ and saturated aq. NaCl. After drying ($MgSO_4$), the mixture is concentrated. The expected product is diene 8.

EXAMPLE 6

Preparation of a Zirconium Complex

A sample of diene 8 (90 mg, 0.6 mmol) is dissolved in hexanes (50 mL) at room temperature, and potassium t-butoxide (136 mg, 1.22 mmol) is added, followed by n-butyllithium (0.61 mL of 2M solution in pentane, 1.22 mmol). The reaction mixture is stirred at room temperature for 20 h. Solids are separated and washed several times with hexanes to remove lithium t-butoxide from the desired dianion salt. Zirconium tetrachloride (135 mg, 0.59 mmol) is added to a slurry of the dianion salt in hexanes (40 mL), and the mixture is stirred at room temperature for 16 h. The expected product is the zirconium complex (10, M=Zr, X=Cl).

EXAMPLE 7

Supporting the Complex

Methyl alumoxane (30% PMAO solution in toluene, product of Albemarle, 1.07 mL) is added slowly to silica (Davison 948 silica, calcined at 250° C. for 4 h prior to use, 2.2 g), and the mixture is stirred at room temperature for 15 min. Separately, a portion of the complex prepared in Example 6 (20 mg) is dissolved in 30% PMAO solution (2.14 mL). This mixture is added using an incipient-wetness technique to the PMAO-treated silica to give a free-flowing solid suitable for use as an olefin polymerization catalyst.

EXAMPLE 8

Ethylene Polymerization

A two-liter reactor is charged with isobutane (900 mL) and a scavenging amount of triisobutylaluminum (1.5 mL of 1 M solution in hexanes, 1.5 mmol). The reactor is heated to 70° C. and pressurized with ethylene to 350 psig. A slurry of the silica-supported catalyst from Example 7 (1.0 g) in isobutane (100 mL) is injected into the reactor to start the polymerization. Ethylene is supplied on demand at 350 psig, and the reaction proceeds at 70° C. for 0.5 h. The reactor is then vented. Polyethylene is the expected product.

EXAMPLE 9

Copolymerization of Ethylene with 1-Butene

A two-liter reactor is charged with hydrogen (20 psig from a 300 mL vessel) followed by isobutane (800 mL), 1-butene (100 mL), and triisobutylaluminum (1.5 mL of 1 M solution in hexanes, 1.5 mmol). The reactor is heated to 70° C. and pressurized with ethylene to 350 psig. A slurry of the silica-supported catalyst from Example 7 (1.0 g) in isobutane (100 mL) is injected into the reactor to start the polymerization. Ethylene is supplied on demand at 350 psig, and the reaction proceeds at 70° C. for 0.5 h. The reactor is then vented. Polyethylene is the expected product.

The preceding examples are meant only as illustrations. The following claims define the invention.

I claim:

1. A method for preparing an organometallic complex useful for olefin polymerization, said method comprising:
   (a) converting a pentacyclic diketone to a triquinane diene;
   (b) doubly deprotonating the triquinane diene to produce a triquinane dianion; and
   (c) reacting the dianion with a transition metal source to give an organometallic complex that incorporates a chelating, dianionic triquinane ligand.

2. The method of claim 1 wherein the pentacyclic diketone is produced by (a) reacting a cyclopentadiene and a p-benzoquinone to produce a Diels-Alder adduct; and (b) photolyzing the Diels-Alder adduct to effect a [2+2] cycloaddition reaction to give the pentacyclic diketone.

3. The method of claim 1 wherein step (a) is accomplished by first heating the pentacyclic diketone to cause a [2+2] cycloreversion reaction to give a cis,syn,cis-triquinane bis(enone), followed by conversion of the bis(enone) to the triquinane diene.

4. The method of claim 3 wherein the bis(enone) is converted to the triquinane diene by (a) reacting the bis(enone) with an arylhydrazine to produce an arylhydrazone; and (b) reducing the arylhydrazone to the diene by reacting it with an alkali metal cyanoborohydride or catecholborane.

5. The method of claim 3 wherein the bis(enone) is converted to the triquinane diene by reacting it with a trialkylhydrosilane in the presence of a Lewis acid.

6. The method of claim 1 wherein step (a) is accomplished by first converting the pentacyclic diketone to a pentacyclic hydrocarbon by reducing the carbonyl groups to methylene groups, and then heating the pentacyclic hydrocarbon to cause a [2+2] cycloreversion reaction to give the triquinane diene.

7. The method of claim 1 wherein the pentacyclic diketone is homologated by reacting it with diazomethane prior to conversion to the triquinane diene.

8. A method for preparing an organometallic complex useful for olefin polymerization, said method comprising:
   (a) reacting a cyclopentadiene and a p-benzoquinone to produce a Diels-Alder adduct;
   (b) photolyzing the Diels-Alder adduct to effect a [2+2] cycloaddition reaction to give a pentacyclic diketone;
   (c) converting the pentacyclic diketone to a triquinane diene;
   (d) doubly deprotonating the triquinane diene to produce a triquinane dianion; and
   (e) reacting the dianion with a transition metal source to give an organometallic complex that incorporates a chelating, dianionic triquinane ligand.

9. The method of claim 8 wherein the Diels-Alder adduct is produced from cyclopentadiene and p-benzoquinone.

* * * * *